United States Patent
Lu et al.

(10) Patent No.: US 10,467,342 B2
(45) Date of Patent: Nov. 5, 2019

(54) METHOD AND APPARATUS FOR DETERMINING SEMANTIC MATCHING DEGREE

(71) Applicant: Huawei Technologies Co., Ltd., Shenzhen (CN)

(72) Inventors: Zhengdong Lu, Hong Kong (HK); Hang Li, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/087,065

(22) Filed: Mar. 31, 2016

(65) Prior Publication Data

US 2016/0217129 A1 Jul. 28, 2016

Related U.S. Application Data

(63) Continuation of application No. PCT/CN2015/075670, filed on Apr. 1, 2015.

(30) Foreign Application Priority Data

Nov. 28, 2014 (CN) .......................... 2014 1 0709568

(51) Int. Cl.
*G06F 17/27* (2006.01)
*G06N 3/04* (2006.01)
*G06F 16/36* (2019.01)

(52) U.S. Cl.
CPC .......... *G06F 17/2785* (2013.01); *G06F 16/36* (2019.01); *G06F 17/277* (2013.01); *G06N 3/0454* (2013.01)

(58) Field of Classification Search
CPC .......... G06F 17/27; G06F 17/20; G06F 17/21; G06F 17/22; G06F 17/2705;
(Continued)

(56) References Cited

U.S. PATENT DOCUMENTS 5,899,989 A * 5/1999 Ikeuchi ................ G06F 9/4446
6,006,221 A 12/1999 Liddy et al.
(Continued)

FOREIGN PATENT DOCUMENTS

CN 103020164 A 4/2013
CN 103092998 A 5/2013
(Continued)

OTHER PUBLICATIONS

Hu, B., et al. "Convolutional Neural Network Architectures for Matching Natural Language Sentences", http://www.noahlab.com.hk/technology/Learning2Match.html, Mar. 11, 2015, 9 pages.
(Continued)

*Primary Examiner* — Qi Han
(74) *Attorney, Agent, or Firm* — Huawei Technologies Co., Ltd.

(57) ABSTRACT

A method and an apparatus for determining a semantic matching degree. The method includes acquiring a first sentence and a second sentence, dividing the first sentence and the second sentence into x and y sentence fragments, respectively, performing a convolution operation on word vectors in each sentence fragment of the first sentence and word vectors in each sentence fragment of the second sentence, to obtain a three-dimensional tensor, performing integration and/or screening on adjacent vectors in the one-dimensional vectors of x rows and y columns, until the three-dimensional tensor is combined into a one-dimensional target vector, and determining a semantic matching degree between the first sentence and the second sentence according to the target vector.

16 Claims, 6 Drawing Sheets

(58) Field of Classification Search
CPC .. G06F 17/271; G06F 17/2715; G06F 17/277; G06F 17/2775; G06F 17/2785
USPC .............................................. 704/9, 1, 7, 10
See application file for complete search history.

(56) References Cited

U.S. PATENT DOCUMENTS

| | | | |
|---|---|---|---|
| 6,298,344 | B1 | 10/2001 | Inaba et al. |
| 6,714,924 | B1 | 3/2004 | McClanahan |
| 7,085,708 | B2 * | 8/2006 | Manson ................ G06F 17/271 704/1 |
| 2002/0187794 | A1 | 12/2002 | Fostick et al. |
| 2005/0120114 | A1 * | 6/2005 | Nadamoto ........ G06F 17/30899 709/225 |
| 2006/0036592 | A1 | 2/2006 | Das et al. |
| 2007/0201634 | A1 | 8/2007 | Bonnaud et al. |
| 2009/0077185 | A1 | 3/2009 | Chiu et al. |
| 2011/0270604 | A1 * | 11/2011 | Qi ......................... G06F 17/271 704/9 |
| 2012/0072220 | A1 | 3/2012 | Zhang et al. |
| 2012/0083287 | A1 | 4/2012 | Casto et al. |
| 2012/0191692 | A1 | 7/2012 | Wang |
| 2013/0013645 | A1 | 1/2013 | Dias et al. |
| 2013/0204885 | A1 * | 8/2013 | Clinchant ............ G06K 9/4676 707/756 |
| 2013/0232098 | A1 * | 9/2013 | Tateishi .............. G06F 17/2785 706/46 |
| 2016/0098437 | A1 | 4/2016 | Lu et al. |

FOREIGN PATENT DOCUMENTS

| | | |
|---|---|---|
| CN | 103605644 A | 2/2014 |
| CN | 104102626 A | 10/2014 |
| CN | 104123389 A | 10/2014 |
| CN | 104750762 A | 7/2015 |
| EP | 0856175 A2 | 8/1998 |
| JP | 2002251401 A | 9/2002 |
| WO | 9708604 A2 | 3/1997 |
| WO | 02063556 A2 | 8/2002 |
| WO | 2004006124 A3 | 1/2004 |
| WO | 2004049307 A1 | 6/2004 |
| WO | 2006020343 A1 | 2/2006 |
| WO | 2013009453 A1 | 1/2013 |

OTHER PUBLICATIONS

Foreign Communication From a Counterpart Application, PCT Application No. PCT/CN2015/075670, English Translation of International Search Report dated Jun. 30, 2015, 2 pages.
Foreign Communication From a Counterpart Application, PCT Application No. PCT/CN2015/075670, Written Opinion dated Jun. 30, 2015, 4 pages.
Li Hua-Bei et al, A New Interactive Video Retrieval Framework Using Semantic Matching. Acta Automatica Sinica, Oct. 2008, 1 page.
Luo an et al, A Semantic Matching Method for Geospatial Information Service Composition Based on Context. Geomatics and Information Science of Wuhan Univers, 2011, 36(3): 368-372., 1 page.

* cited by examiner

METHOD AND APPARATUS FOR DETERMINING SEMANTIC MATCHING DEGREE

CROSS-REFERENCE TO RELATED APPLICATIONS

This application is a continuation of International Application No. PCT/CN2015/075670, filed on Apr. 1, 2015, which claims priority to Chinese Patent Application No. 201410709568.0, filed on Nov. 28, 2014, both of which are hereby incorporated by reference in their entireties.

TECHNICAL FIELD

The present application relates to the field of semantic matching, and in particular, to a method and an apparatus for determining a semantic matching degree.

BACKGROUND

A semantic matching technology has become one of core technologies of natural language processing, and has played an important role in multiple commercial systems, for example, a voice assistant (for example, SIRI or Google-Now), machine translation, and a chatterbot (for example, MICROSOFT's Xiaoice).

In the prior art, sentences to be matched are divided into multiple word vectors, and each word vector has a fixed quantity of dimensions. Based on this, the sentences to be matched are indicated by linear superposition of word vectors that are included in the sentences. A semantic matching degree between two sentences is described as an inner product between vectors of the two sentences.

In the foregoing manner of semantic matching, sentences are divided into word vectors, but a purpose of dividing the sentences into word vectors is to solve vectors that correspond to entire sentences, and ultimately the semantic matching degree between the two sentences is measured as a whole. In such a manner of sentence integral matching, all information about sentences is indicated by one vector, and impact of matching degrees of partial sentence fragments between sentences on a final semantic matching result is ignored, causing that a matching result is inaccurate.

SUMMARY

Embodiments of the present application provide a method and an apparatus for determining a semantic matching degree in order to improve a degree of accuracy of semantic matching.

According to a first aspect, a method for determining a semantic matching degree is provided, including acquiring a first sentence and a second sentence, where the first sentence and the second sentence are sentences to be matched, the first sentence includes a word vectors, and the second sentence includes b word vectors, dividing, using k adjacent word vectors in the first sentence, the first sentence into x sentence fragments, where the $i^{th}$ sentence fragment in the x sentence fragments includes the $i^{th}$ word vector to the $(i+k-1)^{th}$ word vector in the first sentence, where $x=a-k+1$, dividing, using t adjacent word vectors in the second sentence, the second sentence into y sentence fragments, where the $j^{th}$ sentence fragment in the y sentence fragments includes the $j^{th}$ word vector to the $(j+t-1)^{th}$ word vector in the second sentence, where $y=b-t+1$, performing a convolution operation on word vectors in each sentence fragment of the first sentence and word vectors in each sentence fragment of the second sentence, to obtain a three-dimensional tensor, where the three-dimensional tensor includes x rows and y columns of one-dimensional vectors, and a one-dimensional vector in the $i^{th}$ row and the $j^{th}$ column is obtained by performing the convolution operation on word vectors in the $i^{th}$ sentence fragment of the first sentence and word vectors in the $j^{th}$ sentence fragment of the second sentence, performing at least one time of integration and/or at least one time of screening on adjacent vectors in the x rows and y columns of one-dimensional vectors, and continuously reducing quantity of one-dimensional vectors that are included in the three-dimensional tensor, until the three-dimensional tensor is combined into a one-dimensional target vector, and determining a semantic matching degree between the first sentence and the second sentence according to the target vector.

With reference to the first aspect, in an implementation manner of the first aspect, the performing a convolution operation on word vectors in each sentence fragment of the first sentence and word vectors in each sentence fragment of the second sentence, to obtain a three-dimensional tensor includes connecting head to tail elements in k word vectors in each sentence fragment of the first sentence and elements in t word vectors in each sentence fragment of the second sentence, to obtain Q one-dimensional combined vectors, where $Q=x \times y$, and separately performing the convolution operation on the Q one-dimensional combined vectors, to obtain the three-dimensional tensor, where a one-dimensional vector in the $i^{th}$ row and the $j^{th}$ column in the three-dimensional tensor is obtained by performing the convolution operation on a combined vector $T_{ij}$ in the Q one-dimensional combined vectors, where the combined vector $T_{ij}$ is obtained by combining elements in the word vectors in the $i^{th}$ sentence fragment of the first sentence with the word vectors in the $j^{th}$ sentence fragment of the second sentence.

With reference to the first aspect or any one of the foregoing implementation manners of the first aspect, in another implementation manner of the first aspect, performing at least one time of integration and/or at least one time of screening on adjacent vectors in the x rows and y columns of one-dimensional vectors, and continuously reducing quantity of one-dimensional vectors that are included in the three-dimensional tensor, until the three-dimensional tensor is combined into a one-dimensional target vector includes alternately performing integration and screening on the adjacent vectors in the x rows and y columns of one-dimensional vectors, and continuously reducing the quantity of the one-dimensional vectors that are included in the three-dimensional tensor, until the three-dimensional tensor is combined into the target vector.

With reference to the first aspect or any one of the foregoing implementation manners of the first aspect, in another implementation manner of the first aspect, performing at least one time of integration and/or at least one time of screening on adjacent vectors in the x rows and y columns of one-dimensional vectors, and continuously reducing quantity of one-dimensional vectors that are included in the three-dimensional tensor, until the three-dimensional tensor is combined into a one-dimensional target vector includes alternately performing integration and screening on the adjacent vectors in the x rows and y columns of one-dimensional vectors, and continuously reducing the quantity of the one-dimensional vectors that are included in the three-dimensional tensor, until the three-dimensional tensor is combined into a target tensor, and connecting head to tail elements in one-dimensional vectors that are included in the target tensor, to obtain the target vector.

With reference to the first aspect or any one of the foregoing implementation manners of the first aspect, in another implementation manner of the first aspect, the integration is a convolution operation and the screening is a pooling operation.

With reference to the first aspect or any one of the foregoing implementation manners of the first aspect, in another implementation manner of the first aspect, the performing at least one time of integration and/or at least one time of screening on adjacent vectors in the x rows and y columns of one-dimensional vectors, and continuously reducing quantity of one-dimensional vectors that are included in the three-dimensional tensor, until the three-dimensional tensor is combined into a one-dimensional target vector includes performing the at least one time of integration and/or the at least one time of screening on every m×n adjacent one-dimensional vectors in the x rows and y columns of one-dimensional vectors, and continuously reducing the quantity of the one-dimensional vectors that are included in the three-dimensional tensor, until the three-dimensional tensor is combined into the target vector, where m≤x and n≤y.

With reference to the first aspect or any one of the foregoing implementation manners of the first aspect, in another implementation manner of the first aspect, determining a semantic matching degree between the first sentence and the second sentence according to the target vector includes determining the semantic matching degree between the first sentence and the second sentence according to the target vector using a neural network model.

With reference to the first aspect or any one of the foregoing implementation manners of the first aspect, in another implementation manner of the first aspect, determining the semantic matching degree between the first sentence and the second sentence according to the target vector using a neural network model includes obtaining the semantic matching degree between the first sentence and the second sentence according to the target vector using a multilayer perceptron (MLP) model.

With reference to the first aspect or any one of the foregoing implementation manners of the first aspect, in another implementation manner of the first aspect, determining a semantic matching degree between the first sentence and the second sentence according to the target vector includes performing a weighted summation on elements in the target vector according to weights of the elements in the target vector, to obtain the semantic matching degree between the first sentence and the second sentence.

According to a second aspect, an apparatus for determining a semantic matching degree is provided, including an acquiring unit configured to acquire a first sentence and a second sentence, where the first sentence and the second sentence are sentences to be matched, the first sentence includes a word vectors, and the second sentence includes b word vectors, a first division unit configured to divide, using k adjacent word vectors in the first sentence, the first sentence into x sentence fragments, where the $i^{th}$ sentence fragment in the x sentence fragments includes the $i^{th}$ word vector to the $(i+k-1)^{th}$ word vector in the first sentence, where x=a−k+1, a second division unit configured to divide, using t adjacent word vectors in the second sentence, the second sentence into y sentence fragments, where the $j^{th}$ sentence fragment in the y sentence fragments includes the $j^{th}$ word vector to the $(j+t-1)^{th}$ word vector in the second sentence, where y=b−t+1, a computation unit configured to perform a convolution operation on word vectors in each sentence fragment of the first sentence and word vectors in each sentence fragment of the second sentence, to obtain a three-dimensional tensor, where the three-dimensional tensor includes x rows and y columns of one-dimensional vectors, and a one-dimensional vector in the $i^{th}$ row and the $j^{th}$ column is obtained by performing the convolution operation on word vectors in the $i^{th}$ sentence fragment of the first sentence and word vectors in the $j^{th}$ sentence fragment of the second sentence, a combination unit configured to perform at least one time of integration and/or at least one time of screening on adjacent vectors in the x rows and y columns of one-dimensional vectors, and continuously reducing quantity of one-dimensional vectors that are included in the three-dimensional tensor, until the three-dimensional tensor is combined into a one-dimensional target vector, and a determining unit configured to determine a semantic matching degree between the first sentence and the second sentence according to the target vector.

With reference to the second aspect, in an implementation manner of the second aspect, the computation unit is further configured to connect head to tail elements in k word vectors in each sentence fragment of the first sentence and elements in t word vectors in each sentence fragment of the second sentence, to obtain Q one-dimensional combined vectors, where Q=x×y, and separately perform the convolution operation on the Q one-dimensional combined vectors, to obtain the three-dimensional tensor, where a one-dimensional vector in the $i^{th}$ row and the $j^{th}$ column in the three-dimensional tensor is obtained by performing the convolution operation on a combined vector $T_{ij}$ in the Q one-dimensional combined vectors, where the combined vector $T_{ij}$ is obtained by combining the word vectors in the $i^{th}$ sentence fragment of the first sentence with the word vectors in the $j^{th}$ sentence fragment of the second sentence.

With reference to the second aspect or any one of the foregoing implementation manners of the second aspect, in another implementation manner of the second aspect, the combination unit is further configured to alternately perform integration and screening on the adjacent vectors in the x rows and y columns of one-dimensional vectors, and continuously reduce the quantity of the one-dimensional vectors that are included in the three-dimensional tensor, until the three-dimensional tensor is combined into the target vector.

With reference to the second aspect or any one of the foregoing implementation manners of the second aspect, in another implementation manner of the second aspect, the combination unit is further configured to alternately perform integration and screening on the adjacent vectors in the x rows and y columns of one-dimensional vectors, and continuously reduce the quantity of the one-dimensional vectors that are included in the three-dimensional tensor, until the three-dimensional tensor is combined into a target tensor, and connect head to tail elements in one-dimensional vectors that are included in the target tensor, to obtain the target vector.

With reference to the second aspect or any one of the foregoing implementation manners of the second aspect, in another implementation manner of the second aspect, the integration is a convolution operation and the screening is a pooling operation.

With reference to the second aspect or any one of the foregoing implementation manners of the second aspect, in another implementation manner of the second aspect, the combination unit is further configured to perform the at least one time of integration and/or the at least one time of screening on every m×n adjacent one-dimensional vectors in the x rows and y columns of one-dimensional vectors, and continuously reduce the quantity of the one-dimensional vectors that are included in the three-dimensional tensor, until the three-dimensional tensor is combined into the target vector, where m≤x and n≤y.

With reference to the second aspect or any one of the foregoing implementation manners of the second aspect, in another implementation manner of the second aspect, the determining unit is further configured to determine the semantic matching degree between the first sentence and the second sentence according to the target vector using a neural network model.

With reference to the second aspect or any one of the foregoing implementation manners of the second aspect, in another implementation manner of the second aspect, the determining unit is further configured to obtain the semantic matching degree between the first sentence and the second sentence according to the target vector using an MLP model.

With reference to the second aspect or any one of the foregoing implementation manners of the second aspect, in another implementation manner of the second aspect, the determining unit is further configured to perform a weighted summation on elements in the target vector according to weights of the elements in the target vector, to obtain the semantic matching degree between the first sentence and the second sentence.

In the embodiments of the present application, sentences to be matched are divided according to a word order into sentence fragments that are based on word vectors, a convolution operation is performed on every two sentence fragments in two sentences, to obtain a three-dimensional tensor, where not only word orders of the sentences are maintained in the three-dimensional tensor, but also the three-dimensional tensor includes partial matching information of the sentence fragments among the sentences. Then, at least one time of integration and/or at least one time of screening are or is performed on the three-dimensional tensor, and a final semantic matching result is obtained based on a result of the integration or screening. Compared with a matching result that is obtained in an existing sentence integral matching manner, the matching result is more accurate.

BRIEF DESCRIPTION OF DRAWINGS

To describe the technical solutions in the embodiments of the present application more clearly, the following briefly introduces the accompanying drawings required for describing the embodiments of the present application. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are a part rather than all of the embodiments of the present application. All other embodiments obtained by a person of ordinary skill in the art based on the embodiments of the present application without creative efforts shall fall within the protection scope of the present application.

A method for determining a semantic matching degree in the embodiments of the present application is applicable to multiple types of semantic matching systems, for example, a question answering system, a retrieval-based dialog system, and a ranking system in machine retrieval, and these systems are generally referred to as a generalized response system.

Figure 1:
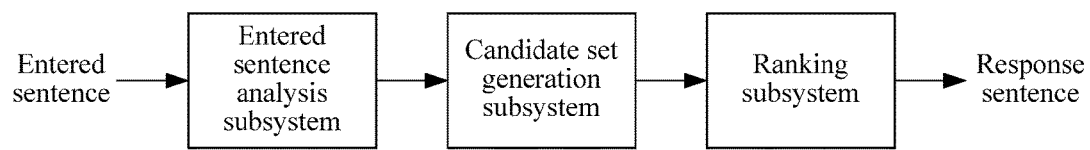
FIG. 1 is an exemplary diagram of a generalized response system architecture.

For ease of understanding, a basic architecture of the generalized response system and an application of a manner of determining semantic matching of the embodiments of the present application in the architecture are briefly described below with reference to FIG. 1. The generalized response system generally includes several subsystems as follows.

An analysis subsystem is configured to perform simple analysis such as simple segmentation or grammatical analysis (parsing) on an entered sentence.

A candidate set generation subsystem is configured to generate a candidate set for the entered sentence. The candidate set includes candidate response sentences of the entered sentence. A process of generating the candidate set may be based on a relatively simple traversal search, or may be based on a complex intelligent search.

A ranking subsystem ranks the candidate response sentences in the candidate set, and then outputs a ranking result. Different systems have different requirements on a ranking result. For example, a machine translation or a dialog system is generally required to output only a candidate response sentence that ranks first, but for a query system, multiple candidate response sentences that rank relatively high may be output.

Figure 2:
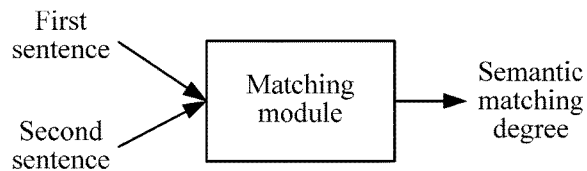
FIG. 2 is a schematic functional diagram of a method for determining a semantic matching degree according to an embodiment of the present application.

It can be learned from the above that, after receiving an entered sentence, the candidate set generation subsystem generates a set that includes a number of (for example, 30 or 1000) candidate response sentences. After this step is completed, the candidate set is entered into the ranking subsystem, and ranking is performed on the candidate set using a ranking method. The method for determining a semantic matching degree in the embodiments of the present application is applicable to the ranking subsystem, and is used as a single ranking algorithm (in this case, ranking depends on a matching degree between an entered sentence and a candidate response sentence), or may be used as a part of a comprehensive ranking algorithm. FIG. 2 can better embody a function that is implemented by the manner of determining a semantic matching degree of the embodiments of the present application. In FIG. 2, the method for determining a semantic matching degree of the embodiments of the present application is implemented by a matching module. When a first sentence and a second sentence are sentences to be matched, a semantic matching degree between the first sentence and the second sentence can be obtained using the matching module.

An application scenario and a general architecture of the method for determining a semantic matching degree of the embodiments of the present application are simply described above, and the method for determining a semantic matching degree of the embodiments of the present application is described in detail below with reference to specific embodiments.

Figure 3:
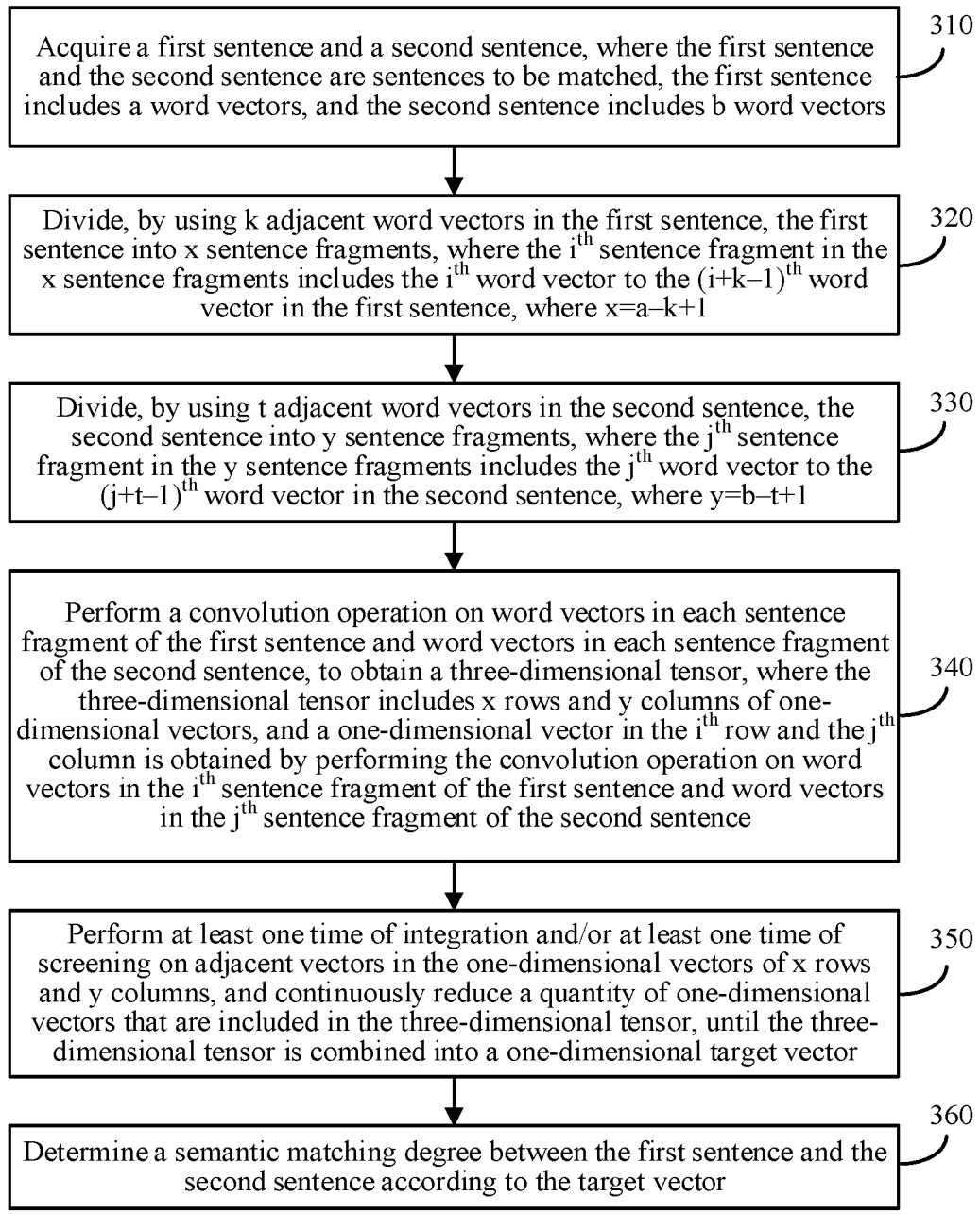
FIG. 3 is a schematic flowchart of a method for determining a semantic matching degree according to an embodiment of the present application.

FIG. 3 is a schematic flowchart of a method for determining a semantic matching degree according to an embodiment of the present application. The method of FIG. 3 includes the following steps.

Step 310: Acquire a first sentence and a second sentence, where the first sentence and the second sentence are sentences to be matched, the first sentence includes a word vectors, and the second sentence includes b word vectors.

It should be understood that a language used by the first sentence and the second sentence is not further limited in this embodiment of the present application. For example, the first sentence and the second sentence are both Chinese sentences, or the first sentence and the second sentence are both English sentences, or the first sentence is a Chinese sentence and the second sentence is an English sentence.

The word vector (word-embedding) described above means that a vector is used to indicate a word, a vector corresponding to each word may have a same quantity of dimensions, and generally, word vectors corresponding to semantically similar words are also similar. For a manner of generating a word vector based on a sentence, refer to the prior art, which is not described in detail again.

Step 320: Divide, using k adjacent word vectors in the first sentence, the first sentence into x sentence fragments, where the $i^{th}$ sentence fragment in the x sentence fragments includes the $i^{th}$ word vector to the $(i+k-1)^{th}$ word vector in the first sentence, where x=a−k+1.

Figure 4:
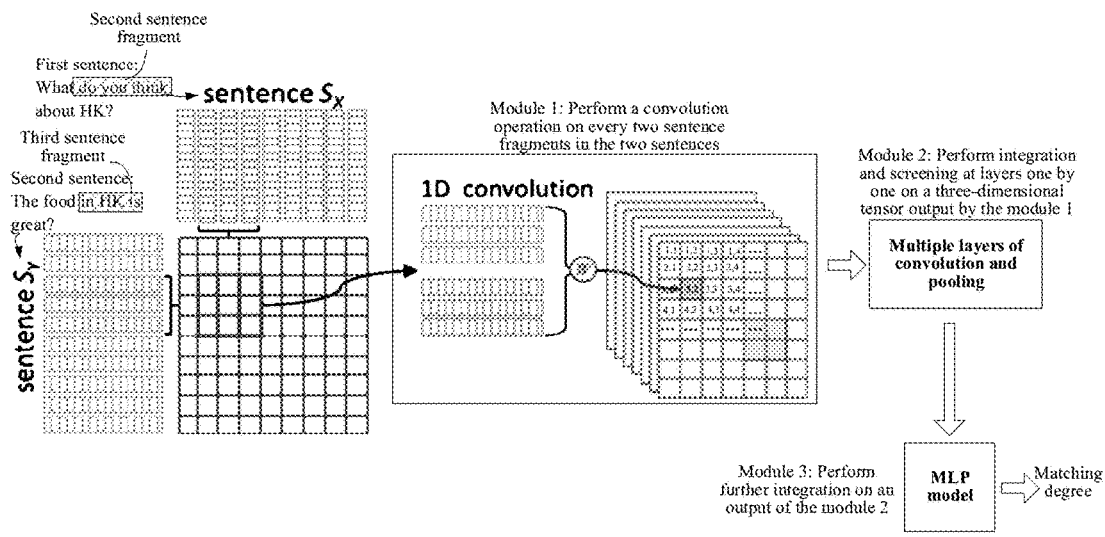
FIG. 4 is an exemplary diagram of a method for determining a semantic matching degree according to an embodiment of the present application.

The first sentence may be divided into x sentence fragments using a word vector-based sliding window, and a size of the sliding window determines a basis for dividing the sentence fragments. For example, when the first sentence includes six word vectors, and a size of the sliding window is three word vectors, the first sentence is divided into four sentence fragments using the sliding window. Using FIG. 4 as an example, a first sentence in FIG. 4 is "What do you think about HK?". Assuming that each English word is one word vector, and a size of a sliding window is three word vectors, the sliding window is slid from left to right according to a word order of the first sentence, and four sentence fragments are obtained, which are "What do you", "do you think", "you think about", and "think about HK". It can be seen from FIG. 4 that, the sliding window (a shaded part in the first sentence) of the first sentence is selecting the second sentence fragment "do you think", and the second sentence fragment includes the second to the fourth word vectors of the first sentence.

Step 330: Divide, using t adjacent word vectors in the second sentence, the second sentence into y sentence fragments, where the $j^{th}$ sentence fragment in the y sentence fragments includes the $j^{th}$ word vector to the $(j+t-1)^{th}$ word vector in the second sentence, where y=b−t+1.

The second sentence may be divided into y sentence fragments using a word vector-based sliding window, and a size of the sliding window determines a basis for dividing the sentence fragments. For example, when the second sentence includes six word vectors, and a size of the sliding window is three word vectors, the second sentence is divided into four sentence fragments using the sliding window. Using FIG. 4 as an example, a second sentence in FIG. 4 is "The food in HK is great!" Assuming that each English word is one word vector, and the size of the sliding window is three word vectors, the sliding window is slid from left to right according to a word order of the second sentence, and four sentence fragments are obtained, which are "The food in", "food in HK", "in HK is", and "BK is great". It can be seen from FIG. 4 that, the sliding window (a shaded part in the second sentence) of the second sentence is selecting the third sentence fragment "in HK is", and the third sentence fragment includes the third to the fifth word vectors of the second sentence.

Step 340: Perform a convolution operation on word vectors in each sentence fragment of the first sentence and word vectors in each sentence fragment of the second sentence, to obtain a three-dimensional tensor, where the three-dimensional tensor includes x rows and y columns of one-dimensional vectors, and a one-dimensional vector in the $i^{th}$ row and the $j^{th}$ column is obtained by performing the convolution operation on word vectors in the $i^{th}$ sentence fragment of the first sentence and word vectors in the $j^{th}$ sentence fragment of the second sentence.

Furthermore, by performing step 340, x rows and y columns of one-dimensional vectors are obtained, and they form a three-dimensional matrix, that is, the three-dimensional tensor described above.

The performing convolution operations on word vectors in each sentence fragment of the first sentence and word vectors in each sentence fragment of the second sentence specifically refers to performing one-on-one convolution operations on each sentence fragment in the x sentence fragments of the first sentence and each sentence fragments in the y sentence fragments of the second sentence. FIG. 4 is used as an example for description. FIG. 4 shows that a convolution operation is performed on the second sentence fragment of the first sentence and the third sentence fragment of the second sentence, and a convolution result is placed at a location (2, 3) in the three-dimensional tensor. Similarly, a convolution operation is performed on another sentence fragment of the first sentence and another sentence fragment of the second sentence, and 16 results are ultimately obtained, namely (1, 1) to (4, 4) in FIG. 4. It should be understood that, by placing a result that is obtained by performing a convolution operation on the $i^{th}$ sentence fragment of the first sentence and the $j^{th}$ sentence fragment of the second sentence at a location (i, j) in the three-dimensional tensor, the three-dimensional tensor can still maintain a unilateral word order relationship between the first sentence and the second sentence.

To perform a convolution operation on two sentences is actually to perform the convolution operation on vectors in the two sentences. A specific manner of performing the convolution operation may be: for each sentence fragment of the first sentence and each sentence fragment of the second sentence, connecting, head to tail, elements in k word vectors in the sentence fragment of the first sentence and elements in t word vectors in the sentence fragment of the second sentence, to obtain an one-dimensional combined vector, total Q one-dimensional combined vectors are obtained, where Q=x×y, and separately performing the convolution operation on the Q one-dimensional combined vectors, to obtain the three-dimensional tensor, where a one-dimensional vector in the $i^{th}$ row and the $j^{th}$ column in the three-dimensional tensor is obtained by performing the convolution operation on a combined vector $T_{ij}$ in the Q one-dimensional combined vectors, where the combined vector $T_{ij}$ is obtained by combining the word vectors in the $i^{th}$ sentence fragment of the first sentence with the word vectors in the $j^{th}$ sentence fragment of the second sentence.

It should be noted that, the foregoing convolution operation is a generalized concept, a function that is implemented by the convolution operation is converting one or more input vectors into another vector for output. In practice, any algorithm or model that can implement the function should fall within the protection scope of this embodiment of the present application.

For example, it is assumed that the $i^{th}$ sentence fragment of the first sentence includes three word vectors, each word vector has 100 dimensions, the $j^{th}$ sentence fragment of the second sentence includes three word vectors, and each word vector also has 100 dimensions. Accordingly, elements in the six vectors are connected head to tail, to form a vector of 600 dimensions, namely, the foregoing vector $T_{ij}$. Then, a one-dimensional convolution operation is performed on the vector $T_{ij}$, to obtain a one-dimensional vector $V_{ij}$ of the three-dimensional tensor. It should be understood that, a result of performing a convolution operation on the vector $T_{ij}$ is still a one-dimensional vector, only that a quantity of dimensions of the vector $T_{ij}$ depends on a specific convolution manner, which is not limited in this embodiment of the present application, as long as it is ensured that a same convolution manner is used when the foregoing convolution operation is performed on each sentence fragment.

Step 350: Perform at least one time of integration and/or at least one time of screening on adjacent vectors in the x rows and y columns of one-dimensional vectors, and continuously reduce quantity of one-dimensional vectors that are included in the three-dimensional tensor, until the three-dimensional tensor is combined into a one-dimensional target vector.

Using FIG. 4 as an example, adjacent vectors in the three-dimensional tensor may refer to vectors with adjacent numbers in the three-dimensional tensor. For example, assuming the three-dimensional tensor is a 4×4 three-dimensional matrix, which includes 16 vectors from (1, 1) to (4, 4) in total. Herein, adjacent vectors may refer to every two adjacent vectors such as vectors (1, 1) and (1, 2), or vectors (2, 2) and (2, 3), or may refer to four adjacent vectors such as vectors (1, 1), (1, 2), (2, 1), and (2, 2), or vectors (2, 2), (2, 3), (3, 2), and (3, 3). In other words, the adjacent vectors herein refer to vectors that are located in adjacent areas in the x rows and y columns of one-dimensional vectors, for example, vectors in every small area of 2×2 are adjacent vectors, or vectors in every small area of 3×4 are adjacent vectors. It should be understood that, a manner of selecting adjacent vectors is flexible and varied, and it may be determined, according to whether a finally obtained semantic matching degree is accurate, which selection manner is further to use. For example, when a semantic matching mode is trained using the method for determining a semantic matching degree of this embodiment of the present application, a manner of selecting adjacent vectors is first used to obtain a semantic matching result, and when the semantic matching result is inaccurate, the manner of selecting adjacent vectors is adjusted until the matching result of the model is accurate.

The adjacent vectors in the three-dimensional tensor are multiple one-dimensional vectors, and integration of these one-dimensional vectors refers to combining these one-dimensional vectors into one vector using an operation form. For example, a convolution operation may be performed to integrate these one-dimensional vectors into a one-dimensional vector, or elements may be connected head to tail to be combined into one one-dimensional vector, and a specific integration manner is not limited in this embodiment of the present application.

The adjacent vectors in the three-dimensional tensor are multiple one-dimensional vectors, and screening of these one-dimensional vectors refers to selecting a one-dimensional vector from these one-dimensional vectors, or selecting some elements from elements of these one-dimensional vectors to be recombined into one one-dimensional vector. For example, maximum values of these vectors in each dimension may be selected to be recombined into a new vector, and a specific screening manner is not limited in this embodiment of the present application.

It should be noted that, for the three-dimensional tensor, only integration may be performed, or only screening may be performed, or any quantity of times of integration and screening may be performed. In addition, there may also be various orders in which integration and screening are performed on the three-dimensional tensor. For example, integration and screening may be alternately performed, or multiple times of integration may be performed first, and then one time of screening is performed. A specific manner and order of integration and screening are not limited in this embodiment of the present application, and in practice, the specific manner and order of integration and screening may be adjusted according to a degree of accuracy of semantic matching, until the degree of accuracy of the semantic matching reaches a preset threshold.

Figure 5:
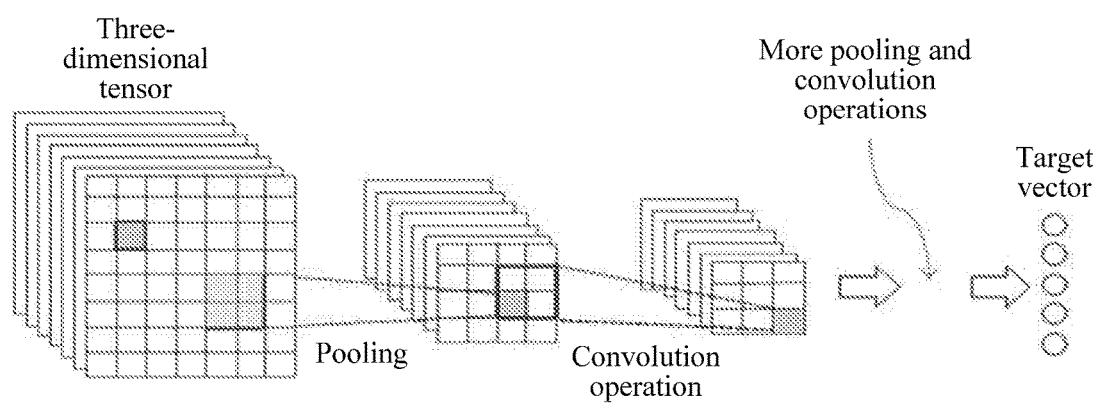
FIG. 5 is an exemplary diagram of integration and pooling of adjacent vectors in a three-dimensional tensor according to an embodiment of the present application.

FIG. 5 is an exemplary diagram of integration and pooling of adjacent vectors in a three-dimensional tensor according to an embodiment of the present application. In FIG. 5, two-dimensional pooling (pooling) is performed on every 2×2, that is, four in total, adjacent vectors in the three-dimensional tensor, to obtain a new one-dimensional vector. The two-dimensional pooling herein may further be that a maximum value is selected from four values that correspond to the four adjacent vectors in each dimension, and a finally obtained one-dimensional vector is obtained by combining the maximum values of the four adjacent vectors in each dimension. A quantity of one-dimensional vectors in the three-dimensional tensor is reduced by performing the two-dimensional pooling operation. A convolution operation is then performed on a diminished three-dimensional tensor. For example, four adjacent vectors are selected and a two-dimensional convolution operation is performed on the four vectors, to reduce one-dimensional vectors in the three-dimensional tensor again. The two-dimensional convolution operation herein may further refer to connecting head to tail elements in the four adjacent vectors, to obtain a one-dimensional combined vector, and then a convolution operation is performed on the one-dimensional combined vector, to obtain a new one-dimensional vector. Then, more two-dimensional pooling operations and convolution operations may be performed, until quantities of times of the two-dimensional pooling and convolution operation reach preset quantities of times, or until quantity of one-dimensional vectors that are included in the three-dimensional tensor is reduced to a preset quantity. It should be noted that, after multiple times of two-dimensional pooling and convolution, the three-dimensional tensor may be directly combined into the foregoing target vector. Alternatively, after the quantity of one-dimensional vectors that are included in the three-dimensional tensor is reduced to a particular quantity, elements in these vectors are connected head to tail, to obtain the foregoing target vector.

Step 360: Determine a semantic matching degree between the first sentence and the second sentence according to the target vector.

There are multiple manners of determining the semantic matching degree between the first sentence and the second sentence according to the target vector. For example, a weight may be set for each element in the target vector, and the semantic matching degree is obtained by means of weighted summation. Alternatively, the matching degree between the first sentence and the second sentence is obtained according to the target vector using a neural network model. Further, the semantic matching degree between the first sentence and the second sentence may be obtained according to the target vector using an MLP model. In other words, the target vector is entered into an MLP model, the MLP outputs a value, and the value is the semantic matching degree between the first sentence and the second sentence. The MLP model is also a neural network model essentially, integration is performed multiple times on multiple target vectors internally, to finally obtain a matching value. For details, refer to the prior art.

It should be noted that, this embodiment of the present application may be used in a process of training a semantic matching model, and when the semantic matching degree obtained in step 360 does not meet the preset threshold, parameters, for example, an order or quantities of times of integration and pooling, or a manner of selecting adjacent vectors in a three-dimensional tensor, in the semantic matching model need to be readjusted. The word vectors that are acquired in step 310 may even be adjusted, until the semantic matching degree meets the preset threshold.

In this embodiment of the present application, sentences to be matched are divided according to a word order into sentence fragments that are based on word vectors, a convolution operation is performed on every two sentence fragments in two sentences, to obtain a three-dimensional tensor, where not only word orders of the sentences are maintained in the three-dimensional tensor, but also the three-dimensional tensor includes partial matching information of the sentence fragments among the sentences, then integration and/or screening is performed on the three-dimensional tensor multiple times, and a final semantic matching result is obtained. Compared with an existing sentence integral matching manner, the matching result is more accurate. Furthermore, an arrangement manner of one-dimensional vectors in the three-dimensional tensor maintains a word order structure of the sentences, and the three-dimensional vector also has a structure in which two sentence fragments interact with each other. Integration and/or screening is performed on the three-dimensional tensor, ultimately an indication of space in which the two sentences interact with each other is obtained, and based on this, a final matching value is obtained. Compared with an existing manner, such a manner is multi-layered and non-linear, and has locality, and an obtained matching result is more accurate.

Optionally, in an embodiment, step 340 may include connecting head to tail elements in k word vectors in the $i^{th}$ sentence fragment of the first sentence and elements in t word vectors in the $j^{th}$ sentence fragment of the second sentence, to be combined into a one-dimensional vector $T_{ij}$, and performing a one-dimensional convolution operation on the vector $T_{ij}$, to obtain a one-dimensional vector $V_{ij}$ located in the $i^{th}$ row and the $j^{th}$ column in the three-dimensional tensor.

An example is used for description. It is assumed that the $i^{th}$ sentence fragment of the first sentence includes three word vectors: [1, 1, 1], [0, 1, 1], and [0, 1, 0]. The $j^{th}$ sentence fragment of the second sentence includes three word vectors: [2, 1, 3], [3, 4, 1], and [0, 1, 0]. Accordingly, a one-dimensional vector $T_{ij}$ that is formed by connecting these vectors head to tail is [1, 1, 1, 0, 1, 1, 0, 1, 0, 2, 1, 3, 3, 4, 1, 0, 1, 0], and a convolution operation is performed on the vector $T_{ij}$, to obtain $V_{ij}$.

Optionally, in an embodiment, step 350 may include alternately performing integration and screening on the adjacent vectors in the x rows and y columns of one-dimensional vectors, and continuously reducing the quantity of the one-dimensional vectors that are included in the three-dimensional tensor, until the three-dimensional tensor is combined into a target tensor, and connecting head to tail elements in one-dimensional vectors that are included in the target tensor, to obtain the target vector.

It should be noted that, in a process of alternately performing integration and screening on the adjacent vectors in the three-dimensional tensor, the quantity of the one-dimensional vectors that are included in the three-dimensional tensor is increasingly reduced, or is increasingly integrated. In other words, after one time of integration is performed, a next time of integration or screening is performed based on a result of this time of integration, rather than that a next time of integration or screening is performed on an original three-dimensional tensor.

Optionally, in another embodiment, step 350 may include alternately performing integration and screening on the adjacent vectors in the x rows and y columns of one-dimensional vectors, and continuously reducing the quantity of the one-dimensional vectors that are included in the three-dimensional tensor, until the three-dimensional tensor is combined into the target vector.

Further, the foregoing integration may be a convolution operation, and the foregoing screening may be a pooling operation. It should be understood that, the convolution operation herein may be the same as or may be different from the convolution operation in step 340, which is not further limited in this embodiment of the present application, and a specific convolution operation manner depends on a degree of accuracy of a finally obtained semantic matching degree.

In other words, the pooling operation is a specific manner of screening the adjacent vectors in the three-dimensional tensor, and the convolution operation is a specific manner of integrating the adjacent vectors in the three-dimensional tensor.

It should be understood that, the method for determining a semantic matching degree of this embodiment of the present application may be used in an actual matching process, or may be used in a process of training a matching model, and the matching model is actually a deep matching model based on a neural network. An example of a process of training the deep matching model is provided below.

First, word vectors are generated from a large quantity of natural sentences in a non-supervised learning manner. Then, the deep matching model is trained based on the generated word vectors in a supervised learning manner. First, parameters of the deep matching model are initialized, and these parameters include a manner (that is, a size of a sliding window) of segmenting sentences, a quantity of layers of the deep matching model, a specific manner of performing integration or screening at each layer, a manner of selecting adjacent vectors when integration or screening is performed at each layer, and the like. Then, training is performed based on a positive example (a sentence that matches an entered sentence) and a negative example (a sentence that does not match the entered sentence) of the natural sentences, to obtain a matching result, and when the matching result is inaccurate, parameters of the deep model are modified for retraining, until a degree of accuracy of matching of the deep matching model meets a preset threshold.

An instance of an application of the method for determining a semantic matching degree of this embodiment of the present application is provided with reference to specific sentences.

It is assumed that an entered sentence is "Barcelona defeated Real Madrid, bravo!".

A candidate response sentence A is "Barcelona won the championship!".

A candidate response sentence B is "So you are a Real Madrid fan".

It can be seen, using a manner of determining a semantic matching degree of this embodiment of the present application, that a positive sentiment ("Barcelona defeated" and "bravo") towards Barcelona and a negative sentiment ("defeated Real Madrid" and "bravo") towards Real Madrid in the entered sentence well match a positive sentiment ("Barcelona and championship") towards Barcelona in the candidate response A, but poorly match a negative sentiment ("Real Madrid and fan") towards Real Madrid in the candidate response B. Therefore, on the whole, the deep matching model (and a ranking subsystem based on the deep matching model) of the present application ranks the candidate response A before the candidate response B.

The method for determining a semantic matching degree of this embodiment of the present application is described in detail above with reference to FIG. 1 to FIG. 5, and an apparatus for determining a semantic matching degree of an embodiment of the present application is described in detail below with reference to FIG. 6 and FIG. 7. It should be understood that, the apparatus in FIG. 6 and FIG. 7 can both implement steps in FIG. 3, and to avoid repetition, details are not provided again herein.

Figure 6:
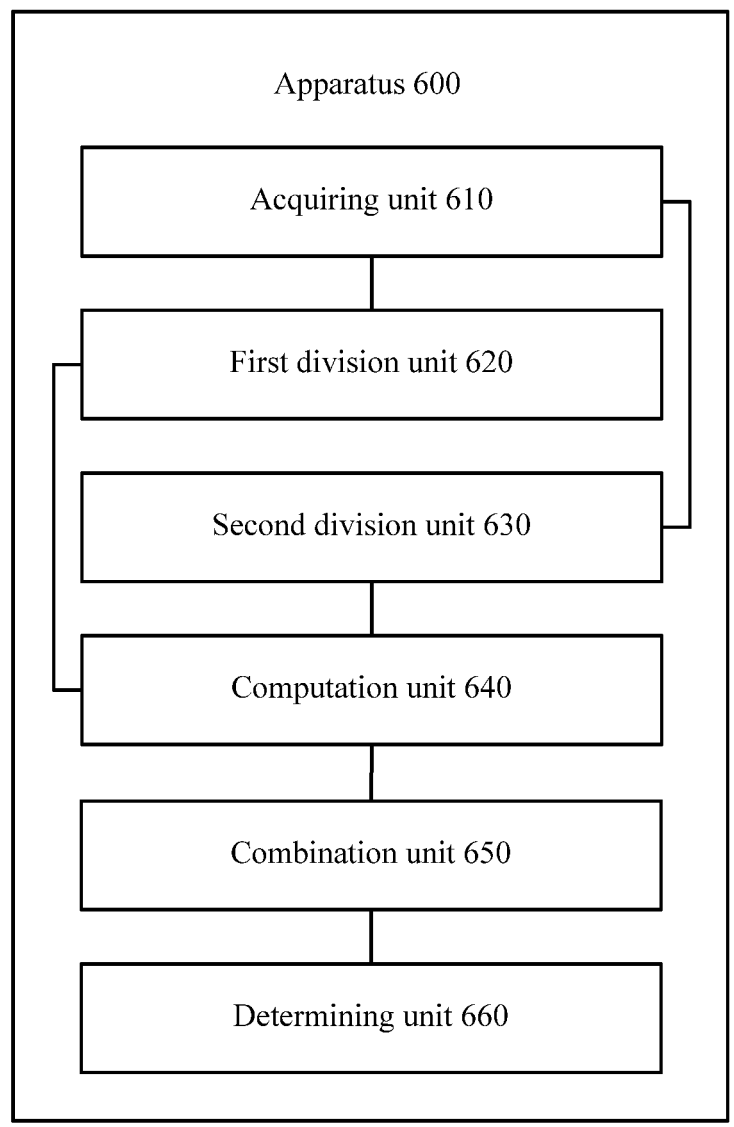
FIG. 6 is a schematic block diagram of an apparatus for determining a semantic matching degree according to an embodiment of the present application.

FIG. 6 is a schematic block diagram of an apparatus for determining a semantic matching degree according to an embodiment of the present application. An apparatus 600 of FIG. 6 includes an acquiring unit 610 configured to acquire a first sentence and a second sentence, where the first sentence and the second sentence are sentences to be matched, the first sentence includes a word vectors, and the second sentence includes b word vectors, a first division unit 620 configured to divide, using k adjacent word vectors in the first sentence, the first sentence into x sentence fragments, where the $i^{th}$ sentence fragment in the x sentence fragments includes the $i^{th}$ word vector to the $(i+k-1)^{th}$ word vector in the first sentence, where x=a−k+1, a second division unit 630 configured to divide, using t adjacent word vectors in the second sentence, the second sentence into y sentence fragments, where the $j^{th}$ sentence fragment in the y sentence fragments includes the $j^{th}$ word vector to the $(j+t-1)^{th}$ word vector in the second sentence, where y=b−t+1, a computation unit 640 configured to perform a convolution operation on word vectors in each sentence fragment of the first sentence and word vectors in each sentence fragment of the second sentence, to obtain a three-dimensional tensor, where the three-dimensional tensor includes x rows and y columns of one-dimensional vectors, and a one-dimensional vector in the $i^{th}$ row and the $j^{th}$ column is obtained by performing the convolution operation on word vectors in the $i^{th}$ sentence fragment of the first sentence and word vectors in the $j^{th}$ sentence fragment of the second sentence, a combination unit 650 configured to perform at least one time of integration and/or at least one time of screening on adjacent vectors in the x rows and y columns of one-dimensional vectors, and continuously reducing quantity of one-dimensional vectors that are included in the three-dimensional tensor, until the three-dimensional tensor is combined into a one-dimensional target vector, and a determining unit 660 configured to determine a semantic matching degree between the first sentence and the second sentence according to the target vector.

In this embodiment of the present application, sentences to be matched are divided according to a word order into sentence fragments that are based on word vectors, a convolution operation is performed on every two sentence fragments in two sentences, to obtain a three-dimensional tensor, where not only word orders of the sentences are maintained in the three-dimensional tensor, but also the three-dimensional tensor includes partial matching information of the sentence fragments among the sentences, then at least one time of integration and/or at least one time of screening is performed on the three-dimensional tensor, and a final semantic matching result is obtained based on a result of the integration or screening. Compared with an existing sentence integral matching manner, the matching result is more accurate. Furthermore, an arrangement manner of one-dimensional vectors that are included in the three-dimensional tensor maintains a word order structure of the sentences, and the three-dimensional tensor also has a structure in which two sentence fragments interact with each other. Integration and/or screening is performed on the three-dimensional tensor, ultimately an indication of space in which the two sentences interact with each other is obtained, and based on this, a final matching value is obtained. Compared with an existing manner, such a manner is multi-layered and non-linear, and has locality, and an obtained matching result is more accurate.

Optionally, in an embodiment, the computation unit 640 is further configured to connect head to tail elements in k word vectors in each sentence fragment of the first sentence and elements in t word vectors in each sentence fragment of the second sentence, to obtain Q one-dimensional combined vectors, where Q=x×y, and separately perform the convolution operation on the Q one-dimensional combined vectors, to obtain the three-dimensional tensor, where a one-dimensional vector in the $i^{th}$ row and the $j^{th}$ column in the three-dimensional tensor is obtained by performing the convolution operation on a combined vector $T_{ij}$ in the Q one-dimensional combined vectors, where the combined vector $T_{ij}$ is obtained by combining the word vectors in the $i^{th}$ sentence fragment of the first sentence with the word vectors in the $j^{th}$ sentence fragment of the second sentence.

Optionally, in an embodiment, the combination unit 650 is further configured to alternately perform integration and screening on the adjacent vectors in the x rows and y columns of one-dimensional vectors, and continuously reduce the quantity of the one-dimensional vectors that are included in the three-dimensional tensor, until the three-dimensional tensor is combined into the target vector.

Optionally, in an embodiment, the combination unit 650 is further configured to alternately perform integration and screening on the adjacent vectors in the x rows and y columns of one-dimensional vectors, and continuously reduce the quantity of the one-dimensional vectors that are included in the three-dimensional tensor, until the three-dimensional tensor is combined into a target tensor, and connect head to tail elements in one-dimensional vectors that are included in the target tensor, to obtain the target vector.

Optionally, in an embodiment, the integration is a convolution operation and the screening is a pooling operation.

Optionally, in an embodiment, the combination unit 650 is further configured to perform the at least one time of integration and/or the at least one time of screening on every m×n adjacent one-dimensional vectors in the x rows and y columns of one-dimensional vectors, and continuously reduce the quantity of the one-dimensional vectors that are included in the three-dimensional tensor, until the three-dimensional tensor is combined into the target vector, where m≤x and n≤y.

Optionally, in an embodiment, the determining unit 660 is further configured to determine the semantic matching degree between the first sentence and the second sentence according to the target vector using a neural network model.

Optionally, in an embodiment, the determining unit 660 is further configured to obtain the semantic matching degree between the first sentence and the second sentence according to the target vector using a multilayer perceptron MLP model.

Optionally, in an embodiment, the determining unit 660 is further configured to perform a weighted summation on elements in the target vector according to weights of the elements in the target vector, to obtain the semantic matching degree between the first sentence and the second sentence.

Figure 7:
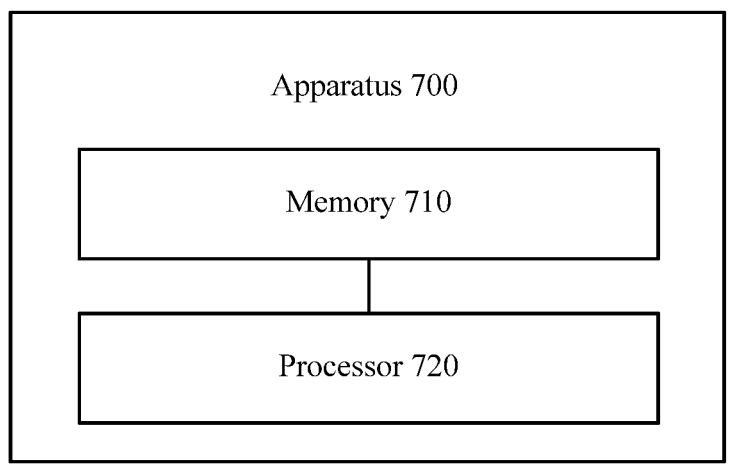
FIG. 7 is a schematic block diagram of an apparatus for determining a semantic matching degree according to an embodiment of the present application.

FIG. 7 is a schematic block diagram of an apparatus for determining a semantic matching degree according to an embodiment of the present application. An apparatus 700 of FIG. 7 includes a memory 710 configured to store a program, and a processor 720 configured to execute the program, where when the program is executed, the processor 720 is configured to acquire a first sentence and a second sentence, where the first sentence and the second sentence are sentences to be matched, the first sentence includes a word vectors, and the second sentence includes b word vectors, divide, using k adjacent word vectors in the first sentence, the first sentence into x sentence fragments, where the $i^{th}$ sentence fragment in the x sentence fragments includes the $i^{th}$ word vector to the $(i+k-1)^{th}$ word vector in the first sentence, where x=a−k+1, divide, using t adjacent word vectors in the second sentence, the second sentence into y sentence fragments, where the $j^{th}$ sentence fragment in the y sentence fragments includes the $j^{th}$ word vector to the $(j+t-1)^{th}$ word vector in the second sentence, where y=b−t+1, perform a convolution operation on word vectors in each sentence fragment of the first sentence and word vectors in each sentence fragment of the second sentence, to obtain a three-dimensional tensor, where the three-dimensional tensor includes x rows and y columns of one-dimensional vectors, and a one-dimensional vector in the $i^{th}$ row and the $j^{th}$ column is obtained by performing the convolution operation on word vectors in the $i^{th}$ sentence fragment of the first sentence and word vectors in the $j^{th}$ sentence fragment of the second sentence, perform at least one time of integration and/or at least one time of screening on adjacent vectors in the x rows and y columns of one-dimensional vectors, and continuously reduce quantity of one-dimensional vectors that are included in the three-dimensional tensor, until the three-dimensional tensor is combined into a one-dimensional target vector, and determine a semantic matching degree between the first sentence and the second sentence according to the target vector.

In this embodiment of the present application, sentences to be matched are divided according to a word order into sentence fragments that are based on word vectors, a convolution operation is performed on every two sentence fragments in two sentences, to obtain a three-dimensional tensor, where not only word orders of the sentences are maintained in the three-dimensional tensor, but also the three-dimensional tensor includes partial matching information of the sentence fragments among the sentences, then at least one time of integration and/or at least one time of screening is performed on the three-dimensional tensor, and a final semantic matching result is obtained based on a result of the integration or screening. Compared with an existing sentence integral matching manner, the matching result is more accurate. Furthermore, an arrangement manner of one-dimensional vectors that are included in the three-dimensional tensor maintains a word order structure of the sentences, and the three-dimensional tensor also has a structure in which two sentence fragments interact with each other. Integration and/or screening is performed on the three-dimensional tensor, ultimately an indication of space in which the two sentences interact with each other is obtained, and based on this, a final matching value is obtained. Compared with an existing manner, such a manner is multi-layered and non-linear, and has locality, and an obtained matching result is more accurate.

Optionally, in an embodiment, the processor 720 is further configured to connect head to tail elements in k word vectors in each sentence fragment of the first sentence and elements in t word vectors in each sentence fragment of the second sentence, to obtain Q one-dimensional combined vectors, where Q=x×y, and separately perform the convolution operation on the Q one-dimensional combined vectors, to obtain the three-dimensional tensor, where a one-dimensional vector in the $i^{th}$ row and the $j^{th}$ column in the three-dimensional tensor is obtained by performing the convolution operation on a combined vector $T_{ij}$ in the Q one-dimensional combined vectors, where the combined vector $T_{ij}$ is obtained by combining the word vectors in the $i^{th}$ sentence fragment of the first sentence with the word vectors in the $j^{th}$ sentence fragment of the second sentence.

Optionally, in an embodiment, the processor 720 is further configured to alternately perform integration and screening on the adjacent vectors in the x rows and y columns of one-dimensional vectors, and continuously reduce the quantity of the one-dimensional vectors that are included in the three-dimensional tensor, until the three-dimensional tensor is combined into the target vector.

Optionally, in an embodiment, the processor 720 is further configured to alternately perform integration and screening on the adjacent vectors in the x rows and y columns of one-dimensional vectors, and continuously reduce the quantity of the one-dimensional vectors that are included in the three-dimensional tensor, until the three-dimensional tensor is combined into a target tensor, and connect head to tail elements in one-dimensional vectors that are included in the target tensor, to obtain the target vector.

Optionally, in an embodiment, the integration is a convolution operation and the screening is a pooling operation.

Optionally, in an embodiment, the processor 720 is further configured to perform the at least one time of integration and/or the at least one time of screening on every m×n adjacent one-dimensional vectors in the x rows and y columns of one-dimensional vectors, and continuously reduce the quantity of the one-dimensional vectors that are included in the three-dimensional tensor, until the three-dimensional tensor is combined into the target vector, where m≤x and n≤y.

Optionally, in an embodiment, the processor 720 is further configured to determine the semantic matching degree between the first sentence and the second sentence according to the target vector using a neural network model.

Optionally, in an embodiment, the processor 720 is further configured to obtain the semantic matching degree between the first sentence and the second sentence according to the target vector using a multilayer perceptron MLP model.

Optionally, in an embodiment, the processor 720 is further configured to perform a weighted summation on elements in the target vector according to weights of the elements in the target vector, to obtain the semantic matching degree between the first sentence and the second sentence.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method implemented by a computing device for determining a semantic matching degree between text-based sentences, comprising:
    receiving, by the device, a first sentence;
    obtaining, by the device, a plurality of second sentences from a memory of the device or an online database;
    comparing, by the device, the first sentence with the plurality of second sentences one by one, to obtain a semantic matching degree between the first sentence and each one of the second sentences; and
    outputting, by the device, a second sentence that has the highest semantic matching degree with the first sentence as a matching sentence of the first sentence;
    wherein the first sentence and the second sentences are text-based sentences, and each of the sentences comprises multiple words; and
    wherein comparing the first sentence with a second sentence to obtain a semantic matching degree between the first sentence and the second sentence comprises:
    obtaining, by the device, n1 word vectors representing the first sentence, and n2 word vectors representing the second sentence, both n1 and n2 are numbers, and each word vector represents one word or several adjacent words in a sentence;
    transforming, by the device, the first sentence into x sentence fragments, wherein each sentence fragment corresponds to k adjacent word vectors, wherein the $i^{th}$ sentence fragment corresponds to the $i^{th}$ word vector to the $(i+k-1)^{th}$ word vector of the first sentence, both k and x are numbers, and wherein x=n1−k+1;
    transforming, by the device, the second sentence into y sentence fragments, wherein each sentence fragment corresponds to t adjacent word vectors, wherein the $j^{th}$ sentence fragment corresponds to the $j^{th}$ word vector to the $(j+t-1)^{th}$ word vector of the second sentence, both t and y are numbers, and wherein y=n2−t+1;
    forming, by the device, a three-dimensional tensor, wherein the three-dimensional tensor comprises x rows as the first dimension, y columns as the second dimension, and a number x×y of z-component arrays as the third dimension, wherein and wherein a z-component array $V_{ij}$ in the $i^{th}$ row and the $j^{th}$ column is obtained by performing a convolution operation on word vectors in the $i^{th}$ sentence fragment of the first sentence and word vectors in the $j^{th}$ sentence fragment of the second sentence;
    continuously reducing, by the device, quantity of the z-component arrays in the three-dimensional tensor by performing integration and/or screening on adjacent z-component arrays, until the three-dimensional tensor is reduced into an one-dimensional target vector; and determining, using a neural network model of the device, the semantic matching degree between the first sentence and the second sentence based on the target vector;

wherein the determined semantic matching degree is applied to multiple types of sematic matching systems including a question answering system, a retrieval-based dialog system, a searching system and a ranking system for machine retrieval.

2. The method according to claim 1, wherein performing the convolution operation on word vectors in the $i^{th}$ sentence fragment of the first sentence and word vectors in the $j^{th}$ sentence fragment of the second sentence comprises:

connecting head to tail elements in k word vectors in the $i^{th}$ sentence fragment of the first sentence and elements in t word vectors in the $j^{th}$ sentence fragment of the second sentence, to obtain an one-dimensional combined vector $T_{ij}$; and performing a convolution operation on the one-dimensional combined vector $T_{ij}$ to obtain the z-component array $V_{ij}$.

3. The method according to claim 1, wherein continuously reducing quantity of the z-component arrays in the three-dimensional tensor by performing integration and/or screening on adjacent z-component arrays, until the three-dimensional tensor is reduced into an one-dimensional target vector comprises:

continuously reducing the quantity of the z-component arrays in the three-dimensional tensor by alternately performing the integration and the screening on the adjacent z-component arrays, until the three-dimensional tensor is combined into the target vector.

4. The method according to claim 3, wherein the integration is a convolution operation, and wherein the screening is a pooling operation.

5. The method according to claim 1, wherein continuously reducing quantity of the z-component arrays in the three-dimensional tensor by performing integration and/or screening on adjacent z-component arrays, until the three-dimensional tensor is reduced into an one-dimensional target vector comprises:

continuously reducing the quantity of the z-component arrays in the three-dimensional tensor by alternately performing the integration and the screening on the adjacent z-component arrays, until the three-dimensional tensor is combined into a target tensor; and connecting head to tail elements comprised in the target tensor, to obtain the target vector.

6. The method according to claim 1, wherein continuously reducing quantity of the z-component arrays in the three-dimensional tensor by performing integration and/or screening on adjacent z-component arrays, until the three-dimensional tensor is reduced into an one-dimensional target vector comprises:

continuously reducing the quantity of the z-component arrays in the three-dimensional tensor by performing integration and/or screening at least once on every m×n adjacent z-component arrays, until the three-dimensional tensor is combined into the target vector, wherein m≤x and n≤y.

7. The method according to claim 1, wherein the neural network model is a multilayer perceptron (MLP) model.

8. The method according to claim 1, wherein determining the semantic matching degree between the first sentence and the second sentence based on the target vector comprises:

performing a weighted summation on elements in the target vector according to weights of the elements in the target vector, to obtain the semantic matching degree between the first sentence and the second sentence.

9. A data processing apparatus capable of determining a semantic matching degree between text-based sentences, comprising:

a memory storing program instructions and a database; and a processor coupled to the memory, wherein the program instructions, when executed by the processor, cause the apparatus to:

obtain a first sentence;

obtain a plurality of second sentences from the memory or an online database;

compare the first sentence with the plurality of second sentences one by one, to obtain a semantic matching degree between the first sentence and each one of the second sentences; and output a second sentence that has the highest semantic matching degree with the first sentence as a matching sentence of the first sentence;

wherein the first sentence and the second sentences are text-based sentences, and each of the sentences comprises multiple words;

and wherein in comparing the first sentence with a second sentence to obtain a semantic matching degree between the first sentence and the second sentence, the program instructions cause the apparatus to:

obtain n1 word vectors representing the first sentence, and n2 word vectors representing the second sentence, both n1 and n2 are numbers, and each word vector represents one word or several adjacent words in a sentence;

transform the first sentence into x sentence fragments, wherein each sentence fragment corresponds to k adjacent word vectors, wherein the $i^{th}$ sentence fragment corresponds to the $i^{th}$ word vector to the $(i+k-1)^{th}$ word vector of the first sentence, both k and x are numbers, and wherein x=n1−k+1;

transform the second sentence into y sentence fragments, wherein each sentence fragment corresponds to t adjacent word vectors, wherein the $j^{th}$ sentence fragment corresponds to the $j^{th}$ word vector to the $(j+t-1)^{th}$ word vector of the second sentence, both t and y are numbers, and wherein y=n2−t+1;

form a three-dimensional tensor, wherein the three-dimensional tensor comprises x rows as the first dimension, y columns as the second dimension, and a number x×y of z-component arrays as the third dimension, wherein and wherein a z-dimensional array $V_{ij}$ in the $i^{th}$ row and the $j^{th}$ column is obtained by performing a convolution operation on word vectors in the $i^{th}$ sentence fragment of the first sentence and word vectors in the $j^{th}$ sentence fragment of the second sentence;

continuously reduce quantity of the z-component arrays in the three-dimensional tensor by performing integration and/or screening on adjacent z-component arrays, until the three-dimensional tensor is reduced into an one-dimensional target vector; and determine, using a neural network model of the apparatus, the semantic matching degree between the first sentence and the second sentence based on the target vector;

wherein the determined semantic matching degree is applied to multiple types of sematic matching systems including a question answering system, a retrieval-based dialog system, a searching system and a ranking system for machine retrieval.

10. The apparatus according to claim 9, wherein in performing the convolution operation on word vectors in the $i^{th}$ sentence fragment of the first sentence and word vectors in the $j^{th}$ sentence fragment of the second sentence, the program instructions cause the apparatus to:
  connect head to tail elements in k word vectors in the $i^{th}$ sentence fragment of the first sentence and elements in t word vectors in the $j^{th}$ sentence fragment of the second sentence, to obtain an one-dimensional combined vector $T_{ij}$; and
  perform a convolution operation on the one-dimensional combined vector $T_{ij}$ to obtain the z-component array $V_{ij}$.

11. The apparatus according to claim 9, wherein in continuously reducing quantity of the z-component arrays in the three-dimensional tensor by performing integration and/or screening on adjacent z-component arrays, until the three-dimensional tensor is reduced into an one-dimensional target vector, the program instructions cause the apparatus to:
  continuously reduce the quantity of the z-component arrays in the three-dimensional tensor by alternately performing the integration and the screening on the adjacent z-component arrays, until the three-dimensional tensor is combined into the target vector.

12. The apparatus according to claim 11, wherein the integration is a convolution operation, and wherein the screening is a pooling operation.

13. The apparatus according to claim 9, wherein in continuously reducing quantity of the z-component arrays in the three-dimensional tensor by performing integration and/or screening on adjacent z-component arrays, until the three-dimensional tensor is reduced into an one-dimensional target vector, the program instructions cause the apparatus to:
  continuously reduce the quantity of the z-component arrays in the three-dimensional tensor by alternately performing the integration and the screening on the adjacent z-component arrays, until the three-dimensional tensor is combined into a target tensor; and
  connect head to tail elements comprised in the target tensor, to obtain the target vector.

14. The apparatus according to claim 9, wherein in continuously reducing quantity of the z-component arrays in the three-dimensional tensor by performing integration and/or screening on adjacent z-component arrays, until the three-dimensional tensor is reduced into an one-dimensional target vector, the program instructions cause the apparatus to:
  continuously reduce the quantity of the z-components arrays in the three-dimensional tensor by performing integration and/or screening at least once on every m×n adjacent z-component arrays, until the three-dimensional tensor is combined into the target vector, wherein m≤x and n≤y.

15. The apparatus according to claim 9, wherein the neural network model is a multilayer perceptron (MLP) model.

16. The apparatus according to claim 9, wherein in determining the semantic matching degree between the first sentence and the second sentence based on the target vector, the program instructions cause the apparatus to:
  perform a weighted summation on elements in the target vector according to weights of the elements in the target vector, to obtain the semantic matching degree between the first sentence and the second sentence.

* * * * *

UNITED STATES PATENT AND TRADEMARK OFFICE
CERTIFICATE OF CORRECTION

PATENT NO. : 10,467,342 B2  
APPLICATION NO. : 15/087065  
DATED : November 5, 2019  
INVENTOR(S) : Lu et al.

Page 1 of 2

It is certified that error appears in the above-identified patent and that said Letters Patent is hereby corrected as shown below:

On the Title Page

On Page 2, item (56), in Column 2, under "OTHER PUBLICATIONS", Line 12, delete "Univers," and insert -- University, --, therefor.

In the Specification

In Column 8, Line 9, delete ""BK" and insert -- "HK --, therefor.

In Column 8, Line 60, delete "an one-dimensional" and insert -- Q one-dimensional --, therefor.

In the Claims

In Column 18, in Claim 1, Line 57, delete "wherein and" and insert -- wherein z≥1, and --, therefor.

In Column 18, in Claim 1, Line 67, delete "an one-dimensional" and insert -- a one-dimensional --, therefor.

In Column 19, in Claim 2, Line 17, delete "an one-dimensional" and insert -- a one-dimensional --, therefor.

In Column 19, in Claim 3, Line 26, delete "an one-dimensional" and insert -- a one-dimensional --, therefor.

In Column 19, in Claim 5, Line 40, delete "an one-dimensional" and insert -- a one-dimensional --, therefor.

In Column 19, in Claim 6, Line 53, delete "an one-dimensional" and insert -- a one-dimensional --, therefor.

Signed and Sealed this  
Twenty-seventh Day of September, 2022

Katherine Kelly Vidal  
*Director of the United States Patent and Trademark Office*

In Column 20, in Claim 9, Line 49, delete "wherein and" and insert -- wherein $z \geq 1$, and --, therefor.

In Column 20, in Claim 9, Lines 57-58, delete "an one-dimensional" and insert -- a one-dimensional --, therefor.

In Column 21, in Claim 10, Line 8, delete "an one-dimensional" and insert -- a one-dimensional --, therefor.

In Column 21, in Claim 11, Line 17, delete "an one-dimensional" and insert -- a one-dimensional --, therefor.

In Column 21, in Claim 13, Line 31, delete "an one-dimensional" and insert -- a one-dimensional --, therefor.

In Column 22, in Claim 14, Line 12, delete "an one-dimensional" and insert -- a one-dimensional --, therefor.